Jan. 17, 1961 H. F. McKENNEY ET AL 2,968,759
PHASE ROTATION CIRCUIT
Filed April 12, 1956
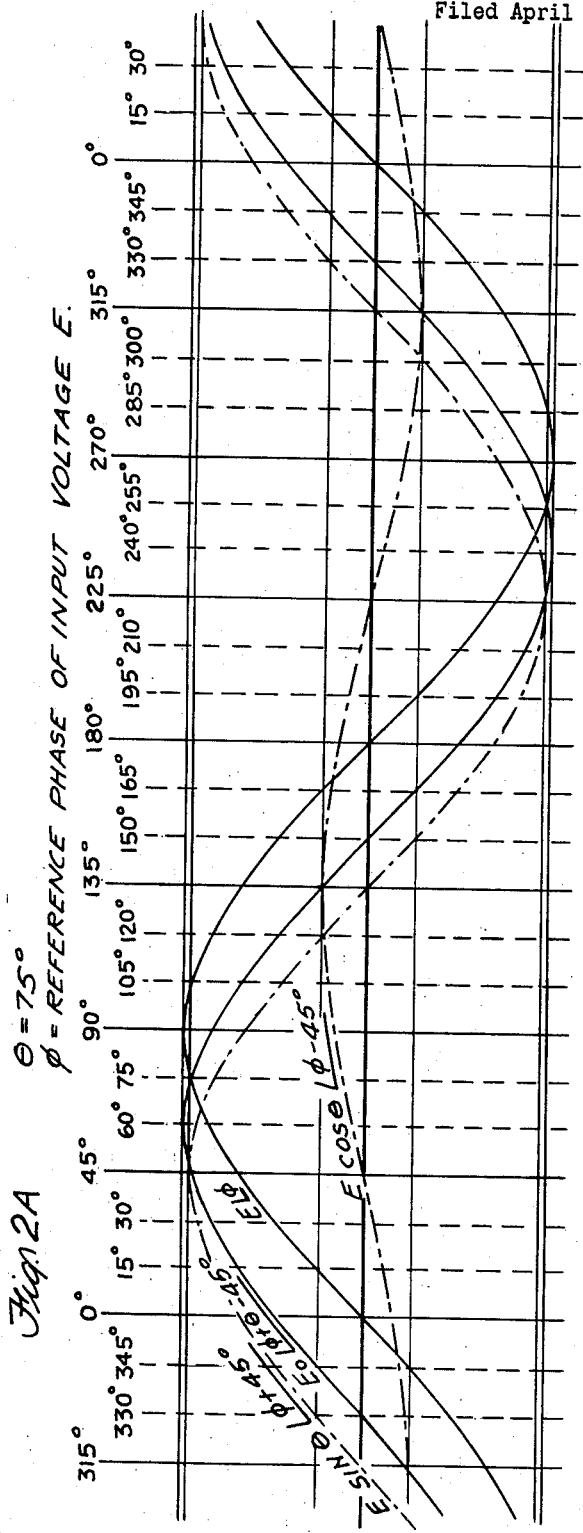
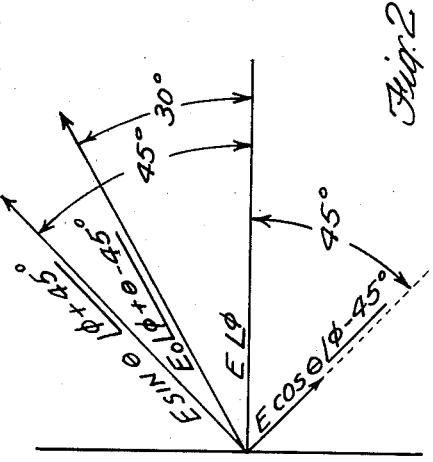
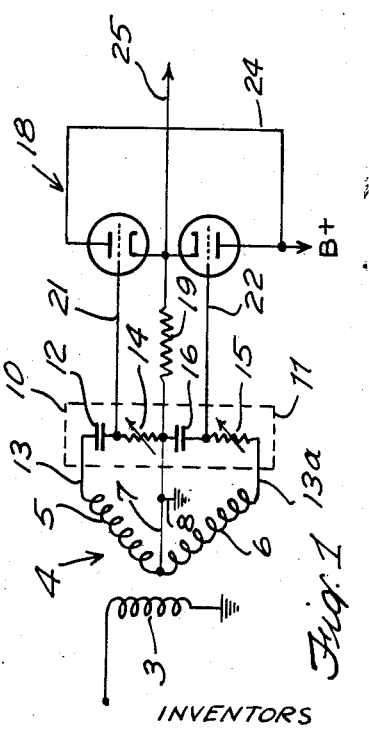
INVENTORS
HENRY F. McKENNEY
WILLIAM F. WEBER
JOHN P. JAGY
BY Victor D. Borst
ATTORNEY

United States Patent Office 2,968,759
Patented Jan. 17, 1961

2,968,759

PHASE ROTATION CIRCUIT

Henry F. McKenney, Valley Stream, William F. Weber, Huntington, and John P. Jagy, Syosset, N.Y., assignors to Sperry-Rand Corporation, Ford Instrument Company Division, Long Island City, N.Y., a corporation of Delaware Filed Apr. 12, 1956, Ser. No. 577,875

1 Claim. (Cl. 323—36)

This invention relates to a phase shifting device and particularly to a device for converting a mechanical angle into a constant amplitude, variable phase voltage which may be used in a phase-sensitive detection system.

Generally the invention utilizes a conventional sine and cosine resolver the rotor of which may be oriented to any preselected position and conventional phase shifting and voltage adding means for reproducing the originally impressed voltage in amplitude but having a phase differing from the phase of the impressed voltage by a constant and the angle of orientation of the rotor of the resolver.

An object of the invention is to provide means for reproducing a given voltage with a predetermined phase shift.

Another object of the invention is to provide a device for converting the dual output of a sine cosine resolver to a single output having a predetermined phase shift which is adapted to be received by a phase sensitive detector.

Other objects and advantages of the device may be appreciated on reading the following description in conjunction with the accompanying drawings, in which Fig. 1 is a schematic of the resolver system as a preferred embodiment of the invention;

Fig. 2 is a vector diagram showing a comparison of the voltage vectors representing the resolver input, phase shifter outputs and the single output of the system; and Fig. 2A is a wave diagram of same.

Referring to the drawings a constant voltage E the phase of which is represented by the symbol E $\lfloor \varphi$ is impressed on the rotor 3 of sine cosine resolver 4. The stator of the resolver comprises a pair of windings 5 and 6 which are mutually disposed at right angles to one another and to which the rotor may be oriented at any desired angle $\theta$. One side of the stator windings 5 and 6 are grounded by means of leads 7 and 8 and the other side of the windings 5 and 6 are connected to phase shifters 10 and 11, respectively. Phase shifter 10 comprises a capacitor 12, which is connected to stator winding 5 by lead 13, and a variable resistor 14 connected in series therewith. Similarly phase shifter 11 comprises a variable resistor 15 connecter to stator winding 6 by lead 13a and a capacitor 16. The resistor 14 and capacitor 16 are connected into the lead 7 which is connected through resistor 19 to the cathode elements of dual cathode follower 18, the grids of which are connected to the phase shifters 10 and 11 between the capacitor and resistor of each device by means of leads 21 and 22, respectively. A constant D.C. voltage is impressed on the plates of the dual cathode follower by means of a common connection 24 and a voltage source B+ (not shown). A lead 25 connects the cathode elements to the output which may be any unit which is sensitive to phase variations in its input such as a phase detector or phase measuring servo system.

In operation the amplitudes of the magnetically coupled voltages in the resolver stator 4 are varied in accordance with the cosine and the sine of the rotor angle of orientation $\theta$. The electrical time phase of the resolver output is the same as that impressed on its rotor. As shown in Fig. 1 the phase shifter 10 is a lead network where the voltage across the resistor 14 leads the impressed voltage from the stator winding 5 by an angle $$\tan^{-1} \frac{1}{2\pi f RC}$$

where the resistance is R, the frequency is $f$ and the capacitance is C. When the resistance R and the reactance of the capacitor C at the frequency $f$ are about equal, the voltage across the resistor leads by an angle of about 45°. Similarly the voltage picked off between the capacitor resistor combination in phase shifter 11 lags the impressed voltage by substantially 45°. A comparison of the two voltage curves representing the output of the phase shifter is shown in Fig. 2 for a rotor angle $\theta$ of 75°. The input voltage E is shown as having a reference phase $\phi$. When the two voltages shown in dash dot lines are added in the dual cathode follower, the resulting output Eo is a voltage of constant amplitude which is proportional to the magnitude of the input and has an electrical phase angle which leads the input voltage by 30° in accordance with the formula $\phi+\theta-45$. The amplitude of the voltage Eo is therefore equal to KE where K is the measurable multiplicative constant for the device representing the gain of the cathode follower. The resultant output Eo is shown on the graphs of Fig. 2 and Fig. 2A. Similarly it may be shown that the output voltage Eo will have a constant amplitude and bear a lagging phase relation of $\phi+45°-\theta$ to the impressed voltage when the phase shifters 10 and 11 are interchanged.

It should be understood that the units shown succeeding the resolver in the described system may be replaced by equivalent units for phase shifting voltages and comparing them in a common output and that such substitutions may be made without departing from the principle of invention as defined in the following claim.

What is claimed is:

A resolver system comprising a rotor winding adapted to receive an impressed voltage having a given amplitude E and phase $\phi$ and a rotor orientable to a preselected mechanical angle $\theta$ and having a pair of windings adapted to yield sine and cosine functions of the angle $\theta$ and the impressed voltage E to a dual output, a phase shifting network adapted to produce an output voltage which leads the phase of its input voltage, a second phase shifting network adapted to produce a voltage which lags the phase of its input voltage, each of said networks comprising a capacitor and a variable resistor in series connection, one side of each of said stator windings being connected separately to one side of each of said capacitor-resistor combinations, the other side of said capacitor-resistor combinations being connected to the other side of each of said stator windings and to a common output lead, said other side of the stator windings being grounded, and a dual cathode follower having a pair of grid elements with each of said grid elements being separately connected to the capacitor-resistor junction of one of said networks and having cathode elements connected to said output lead, a resistor disposed in said output lead between the grounded sides of said phase shifting networks and the cathode elements of said dual cathode follower, whereby the voltage phase on said output lead differs from the phase of the impressed voltage on said resolver system as determined by said networks and the preselected setting of said resolver and its phase will lag or lead the phase of the impressed voltage according to the setting of said rotor and said variable resistor.

References Cited in the file of this patent

UNITED STATES PATENTS

| | | |
|---|---|---|
| 2,254,734 | Falloon et al. | Sept. 2, 1941 |
| 2,256,538 | Alford | Sept. 23, 1941 |
| 2,711,508 | Stirrat | June 21, 1955 |